(12) United States Patent
Kim

(10) Patent No.: US 6,419,125 B1
(45) Date of Patent: Jul. 16, 2002

(54) DISPENSER

(75) Inventor: Jung-Soo Kim, Masan (KR)

(73) Assignee: Darin Co., Ltd., Kyungnam (KR)

( * ) Notice: Subject to any disclaimer, the term of this patent is extended or adjusted under 35 U.S.C. 154(b) by 0 days.

(21) Appl. No.: 09/755,624

(22) Filed: Jan. 5, 2001

(51) Int. Cl.[7] .............................................. G01F 11/42
(52) U.S. Cl. ................................. 222/321.9; 222/321.2
(58) Field of Search ........................ 222/321.1, 321.2, 222/321.3, 321.7, 321.9, 372, 383.1, 385, 153.07, 153.13

(56) References Cited

U.S. PATENT DOCUMENTS

| | | | | |
|---|---|---|---|---|
| 3,062,416 A | * | 11/1962 | Cooprider ................. | 222/321.9 |
| 3,228,571 A | * | 1/1966 | O'Donnell et al. ....... | 222/321.7 |
| 3,362,344 A | * | 1/1968 | Duda ........................ | 222/321.1 |
| 5,303,854 A | * | 4/1994 | Cater ........................ | 222/321.2 |
| 5,445,299 A | * | 8/1995 | Harriman ................. | 222/153.13 |
| 5,806,721 A | * | 9/1998 | Tada ........................ | 222/153.13 |

* cited by examiner

Primary Examiner—William Doerrler
Assistant Examiner—Thach H. Bui
(74) Attorney, Agent, or Firm—Akin, Gump, Strauss, Hauer & Feld, L.L.P.

(57) ABSTRACT

A dispenser for transferring a liquid from a container includes a dispenser body having a first end, a second end and an inner surface. The first end has an aperture through which the body is capable of receiving at least a portion of the liquid. A valve stem is slidably disposed within the dispenser body in engagement with the inner surface proximate to the first end for movement between a first position and a second position. The valve stem and the dispenser body are configured to limit the motion of the valve stem between the first and second positions to linear motion. The dispenser may include at least one thread disposed on a generally outwardly facing surface of a dispenser body capable of releasably threadably engaging the nozzle when the nozzle is in the closed position.

22 Claims, 9 Drawing Sheets

DISPENSER

BACKGROUND OF THE INVENTION

The present invention is directed to devices for transferring liquid from a container and, more specifically, to a dispenser having a structure that increases the efficiency of liquid transport, that is easy to assemble and that reduces the admission of contaminants into the dispenser.

Dispensers are commonly used to remove liquids, such as shampoos or moisturizers, that are packaged in containers. The liquid is ejected from the container by repeatedly depressing and releasing the nozzle of the dispenser to transfer liquid from the container into the dispenser and out of an attached spout or spray nozzle.

Conventional dispensers have many drawbacks which impede the efficient transport of liquid. One example of a conventional dispenser 10' is shown in FIG. 10. The conventional dispenser 10' uses a ball valve 12' to regulate the transfer of liquid between the container (not shown) and the dispenser 10'. The use of a ball valve 12' increases the probability of misalignment between the ball valve 12' and the aperture 22' through which liquid is transferred from the container to the dispenser 10'. Misalignment between the ball valve 12' and aperture 22' results in reduced liquid transfer.

The conventional dispenser 10' has a threaded interface 82' between an inner surface of the dispenser body 16' and a portion of the nozzle 14' which results in a gap along the interface between the nozzle 14' and the dispenser body 16' when the nozzle 14' is in the up position. The threaded interface 82' is used to secure the nozzle 14' in the down position (not shown). The gap caused by the threaded interface 82' between the nozzle 14' and the dispenser body 16' increases the admission of contaminants, such as water, into the dispenser body 16' and thus, into the container which can degrade, or ruin, the liquid contained therein.

A spring 56' is positioned within the dispenser body 16' to bias the nozzle 14' generally outwardly from the dispenser body 16'. The spring 56' is typically positioned between the aperture 22' and a fluid receiving end 74' of a tube 64' that is attached to the nozzle 14'. This positioning of the spring 56' results in a decreased volume within the dispenser body 16' for temporarily storing liquid which has been removed from the container for ejection via the nozzle 14'.

What is needed, but so far not provided by the conventional art, is a dispenser having a valve stem that maintains a consistent alignment with a dispenser aperture to regulate the flow of liquid into the dispenser body, that has a nozzle which can be readily secured to the dispenser body in the down position without using a threaded connection along the slidable interface between the dispenser body and the nozzle, that biases the nozzle away from the dispenser body without reducing the available volume within the dispenser for temporarily storing liquid, and that has a structure which can be readily assembled.

BRIEF SUMMARY OF THE INVENTION

Briefly stated, the present invention is directed to a dispenser for transferring a liquid from a container including a dispenser body having a first end, a second end and an inner surface. The first end has an aperture through which the body is capable of receiving at least a portion of the liquid. A nozzle is slidably engaged with the second end of the dispenser body and is capable of ejecting at least a portion of the liquid contained in;the dispenser body while the nozzle is being depressed generally toward the first end of the dispenser body. A valve stem is slidably disposed within the dispenser body in engagement with the inner surface proximate to the first end for movement between a first position and a second position. While the nozzle is being depressed generally toward the first end of the dispenser, the valve stem moves to the first position and substantially obstructs the aperture to generally prevent the liquid from flowing through the aperture. While the nozzle is being displaced away from the first end of the dispenser body, the valve stem moves to the second position causing the aperture to be at least partially unobstructed by the valve stem so that the dispenser body is capable of receiving the liquid. The valve stem and the dispenser body are configured to limit the motion of the valve stem between the first and second positions to linear motion.

Alternatively, the present invention is directed to a dispenser for transferring liquid from a container including a dispenser body having a first end, a second end and an inner surface. The first end has an aperture through which the dispenser body is capable of receiving at least a portion of the fluid. A nozzle is slidably engaged with the second end of the dispenser body and is capable of ejecting a portion of the liquid contained in the dispenser body while the nozzle is being depressed generally toward the first end of the dispenser body. At least one thread is disposed on a generally outwardly facing surface of the dispenser body proximate to the second end of the dispenser body and is capable of releasably threadably engaging the nozzle.

Alternatively, the present invention is directed to a dispenser for transferring liquid from a container including a dispenser body having a first end, a second end and an inner surface. The first end has an aperture through which the dispenser body is capable of receiving at least a portion of the liquid. A nozzle is slidably engaged with the second end of the dispenser body and is capable of ejecting at least a portion of the liquid contained in the dispenser body while the nozzle is being depressed generally toward the first end of the dispenser body. The slidable engagement between the nozzle and the dispenser body occurs between a generally smooth, continuous nozzle surface and a generally smooth, continuous dispenser body surface which are in complementary, slidable, facing engagement.

BRIEF DESCRIPTION OF THE SEVERAL VIEWS OF THE DRAWINGS

The foregoing summary, as well as the following detailed description of the preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangement and instrumentality shown. In the drawings.

DETAILED DESCRIPTION OF THE INVENTION

Figure 1:
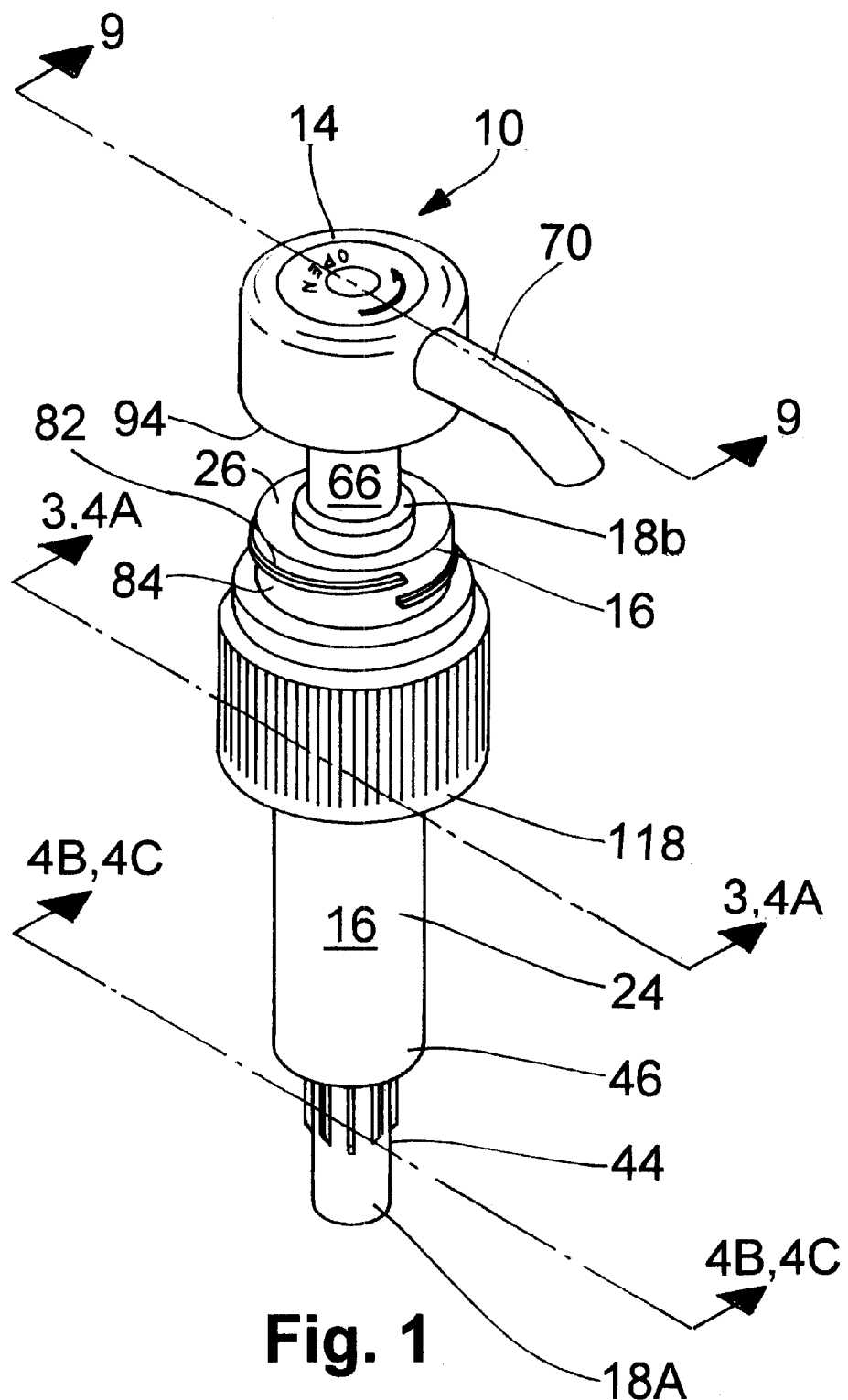
FIG. 1 is a top perspective view of a dispenser according to the present invention.

Certain terminology is used in the following description for convenience only and is not limiting. The words "right," "left," "lower" and "upper" designate directions in the drawings to which reference is made. The words "inwardly" and "outwardly" refer to directions toward and away from, respectively, the geometric center of the dispenser and designated parts thereof. The terminology includes the words above specifically mentioned, derivatives thereof and words of similar import. Additionally, the word "a," as used in the claims and in the corresponding portions of the specification, means "at least one."

Figure 7:
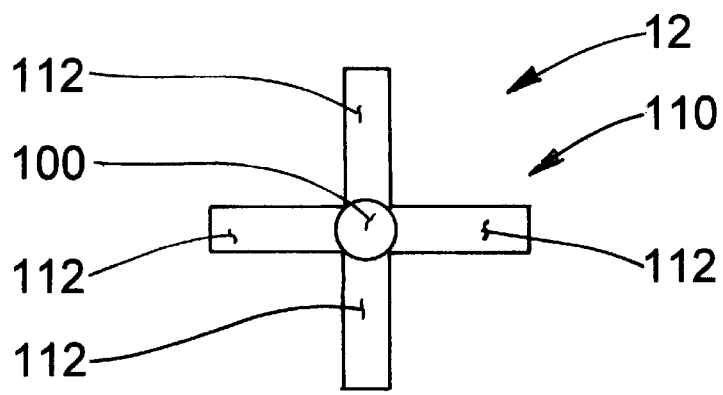
FIG. 7 is a top plan view of the valve stem of FIG. 5.
Figure 6:
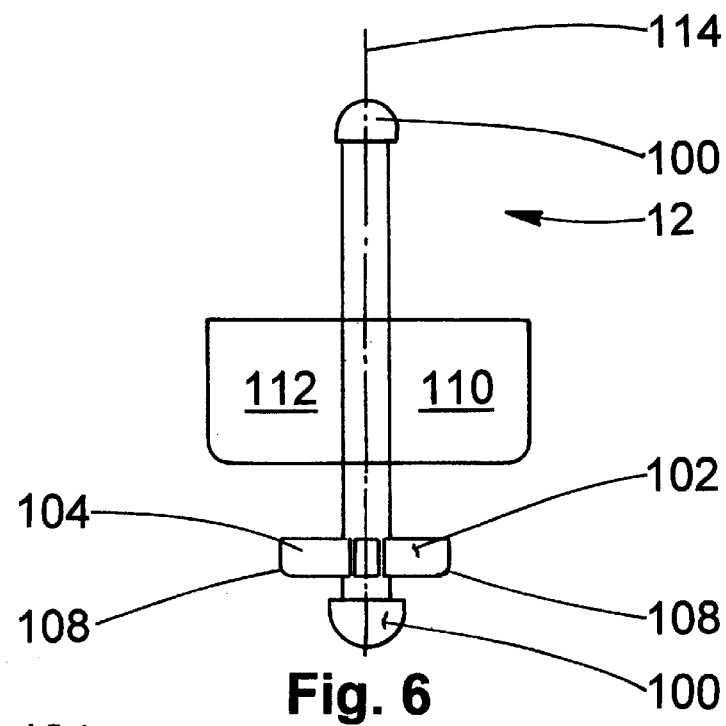
FIG. 6 is a side elevational view of the valve stem of FIG. 5.
Figure 8:
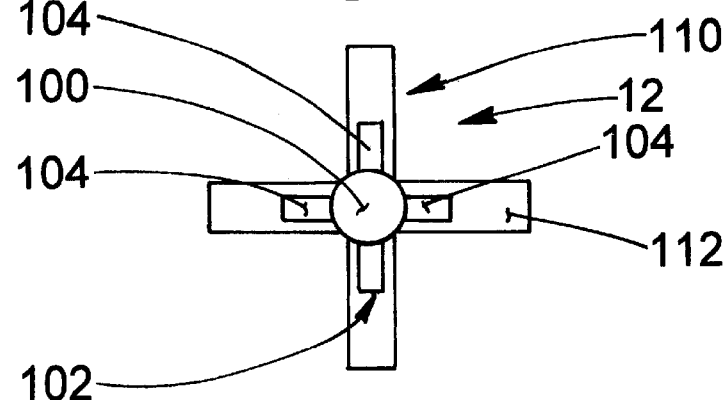
FIG. 8 is a bottom plan view of the valve stem of FIG. 5 illustrating the alignment of a first plurality of beams and a second plurality of beams, one behind the other, when viewing the valve stem along a valve stem axis.
Figure 9:
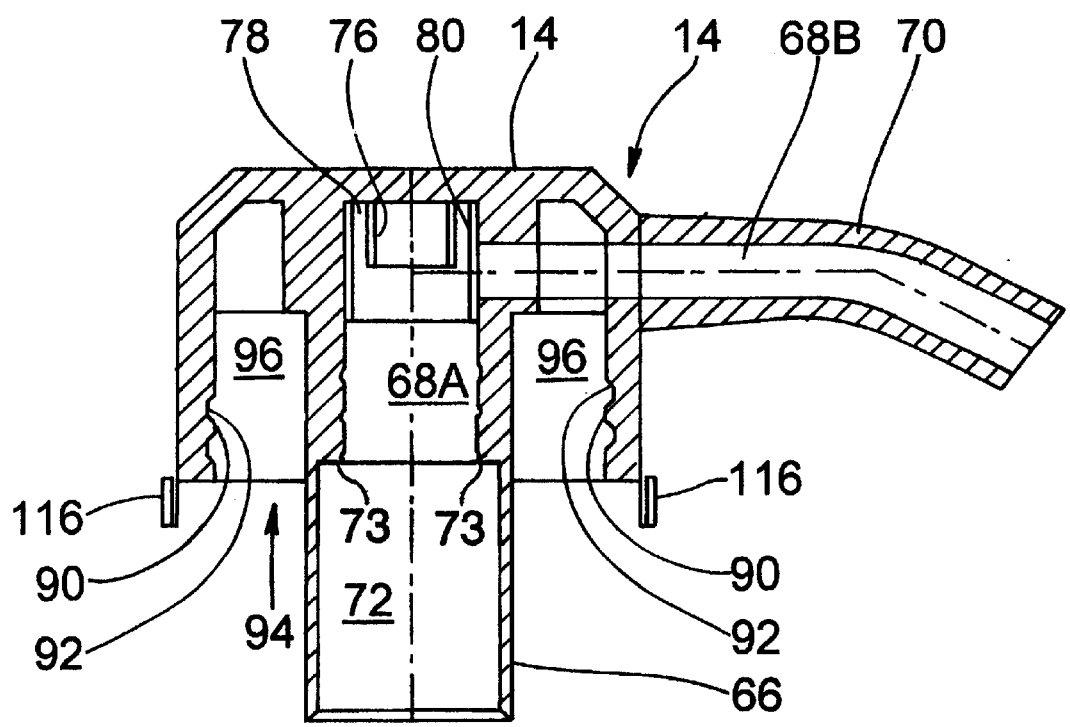
FIG. 9 is a partial cross-sectional view of the dispenser of FIG. 1 as taken along the line 9—9 of FIG. 1 illustrating the nozzle.
Figure 10:
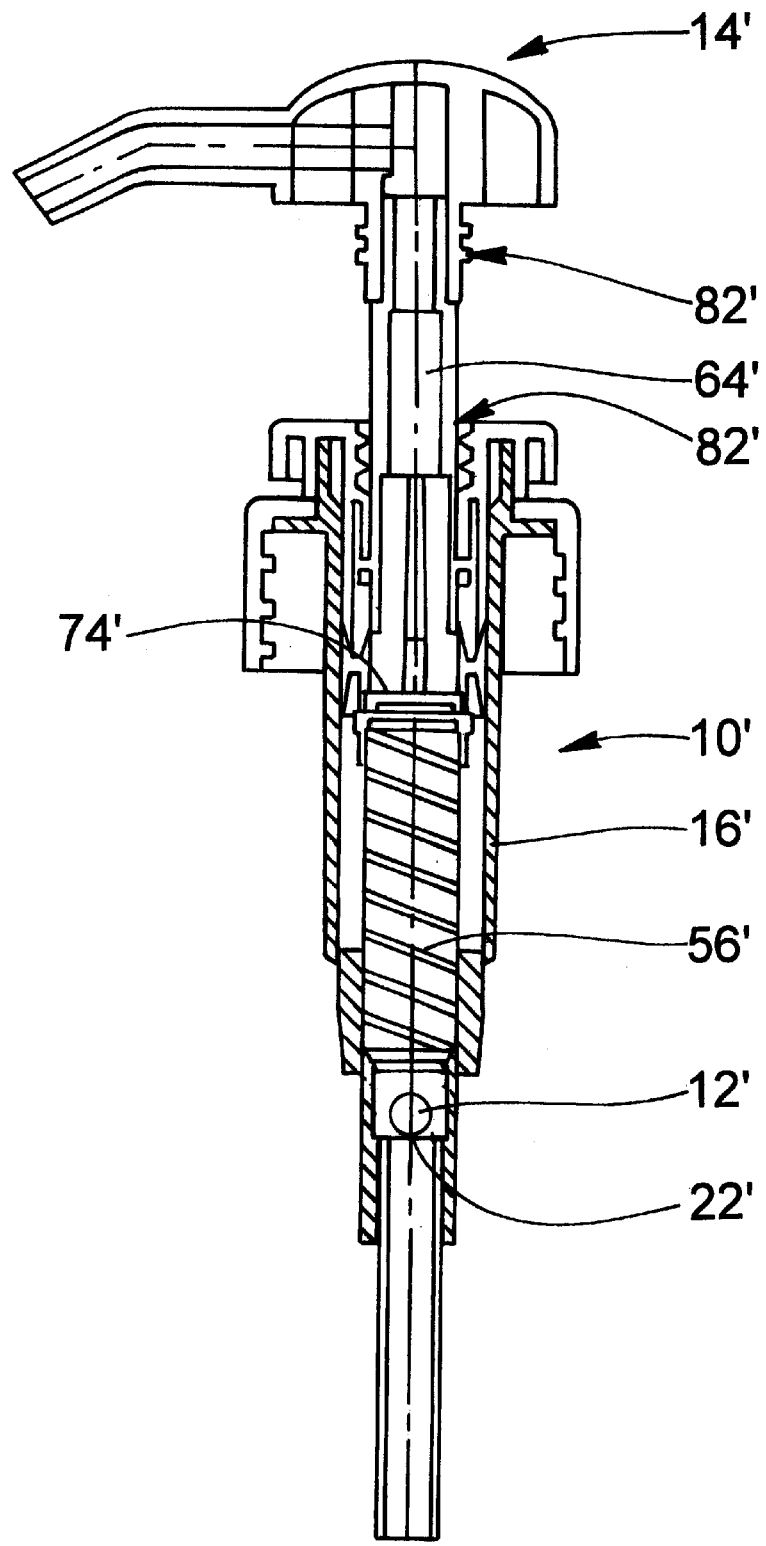
FIG. 10 is a cross-sectional view of a prior art dispenser.

Referring to the drawings in detail, wherein like numerals refer to like elements throughout, FIGS. 1–9 illustrate a preferred embodiment of the dispenser according to the present invention, generally designated as 10. FIGS. 4B and 4C illustrate a valve stem 12 that regulates the flow of liquid into the dispenser 10 in first and second positions, respectively. FIGS. 5–8 illustrate a preferred embodiment of the valve stem 12 according to the present invention. FIG. 9 illustrates a nozzle 14 for use with the dispenser 10 of the present invention. FIG. 10 illustrates a prior art dispenser 10'.

The dispenser 10 and its components are preferably formed of a lightweight, durable, non-reactive material, such as a polymer. Depending upon the liquid being handled by the dispenser 10, those of ordinary skill in the art will appreciate that various materials can be used to form the dispenser 10, such as aluminum, steel, Inconel™, alloys or the like. The selection of the appropriate materials for use with a particular liquid, or liquid mixture, is within the ambit of one of ordinary skill in the art when considered in combination with this disclosure.

The dispenser 10 is preferably for transferring liquid (not shown) from a container (not shown). Those of ordinary skill in the art will appreciate from this disclosure that the container may have any shape without departing from the scope of the present invention. Those of ordinary skill in the art will also appreciate that the present invention is not limited to any particular type of liquid for transport by the dispenser 10. For instance, the liquid may be any one of a soap, a shampoo, an engine lubricant, an insecticide, a bleach, a solvent or the like without departing from the scope of the present invention.

Figure 2:
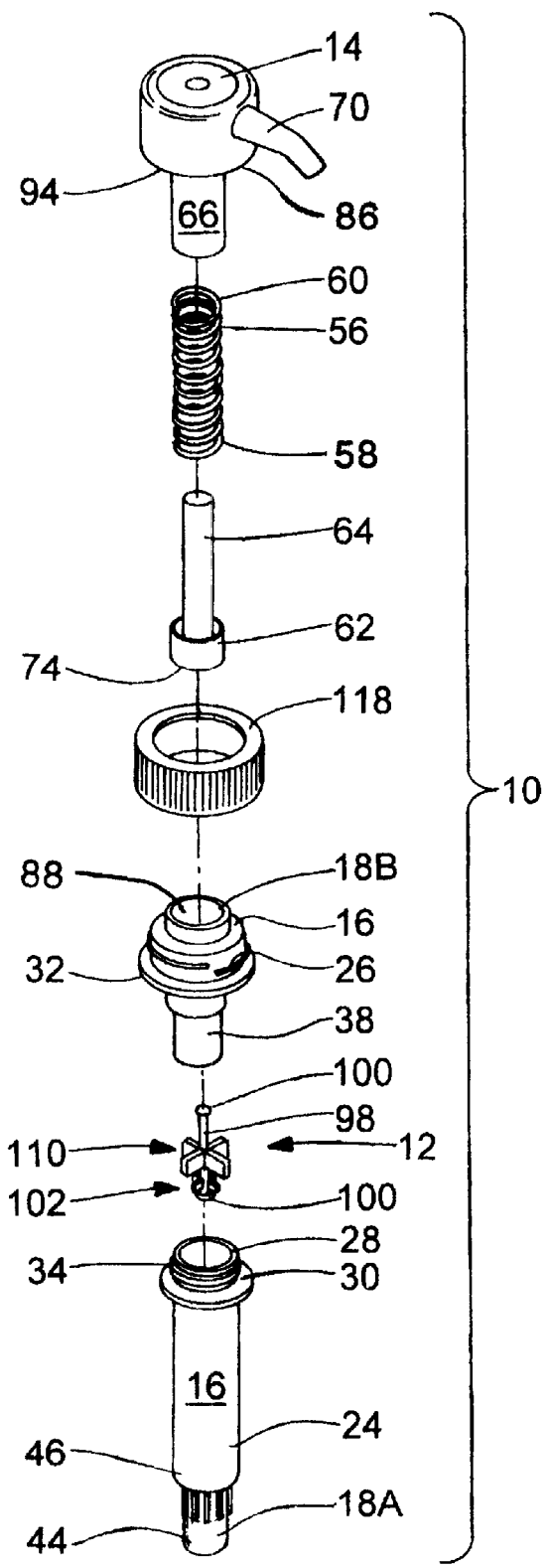
FIG. 2 is an exploded view of the dispenser of FIG. 1.
Figure 3:
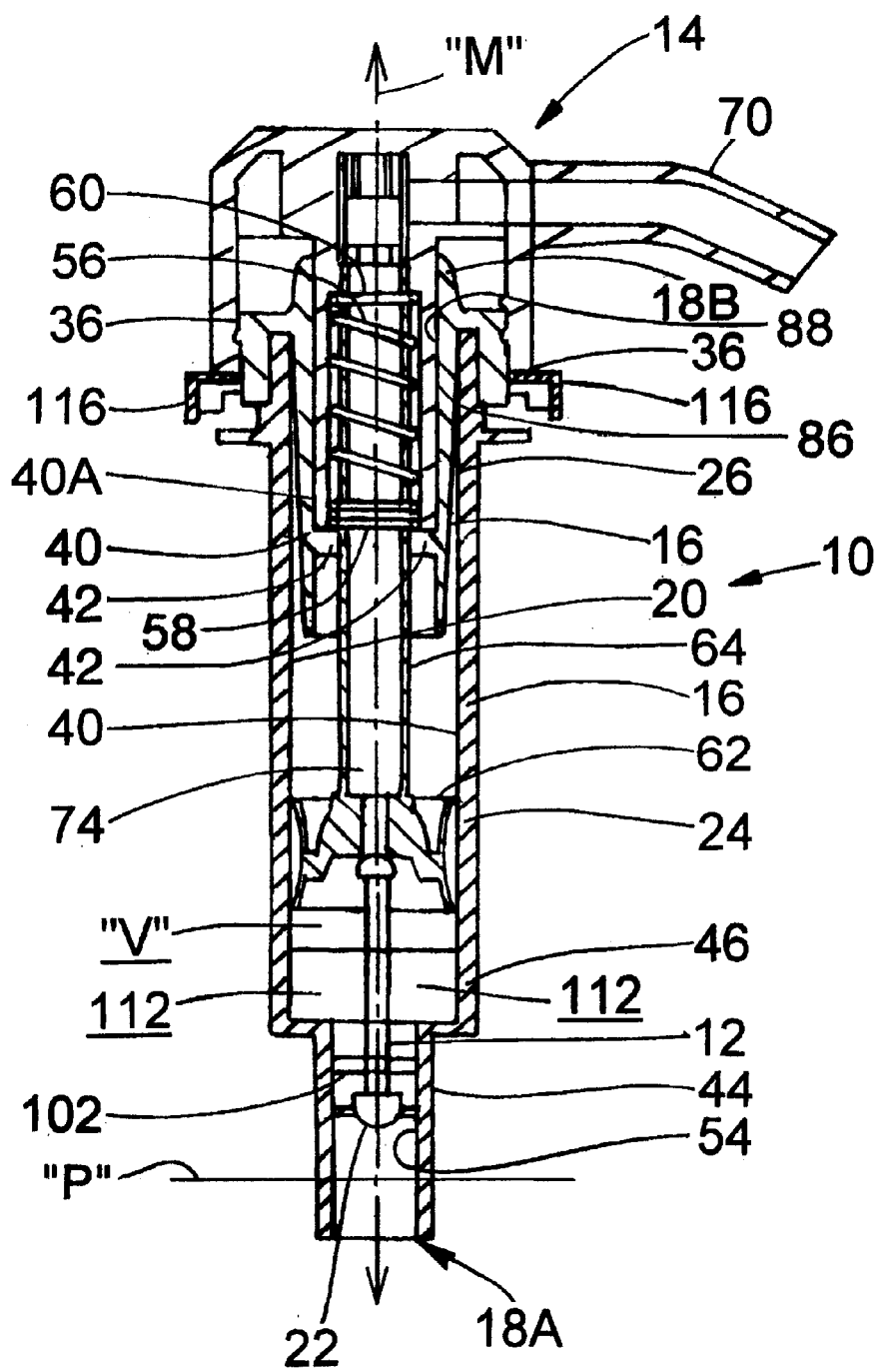
FIG. 3 is a cross-sectional view of the dispenser of FIG. 1 as taken along the line 3,4A—3,4A of FIG. 1 illustrating the dispenser in a closed position.
Figure 4A:
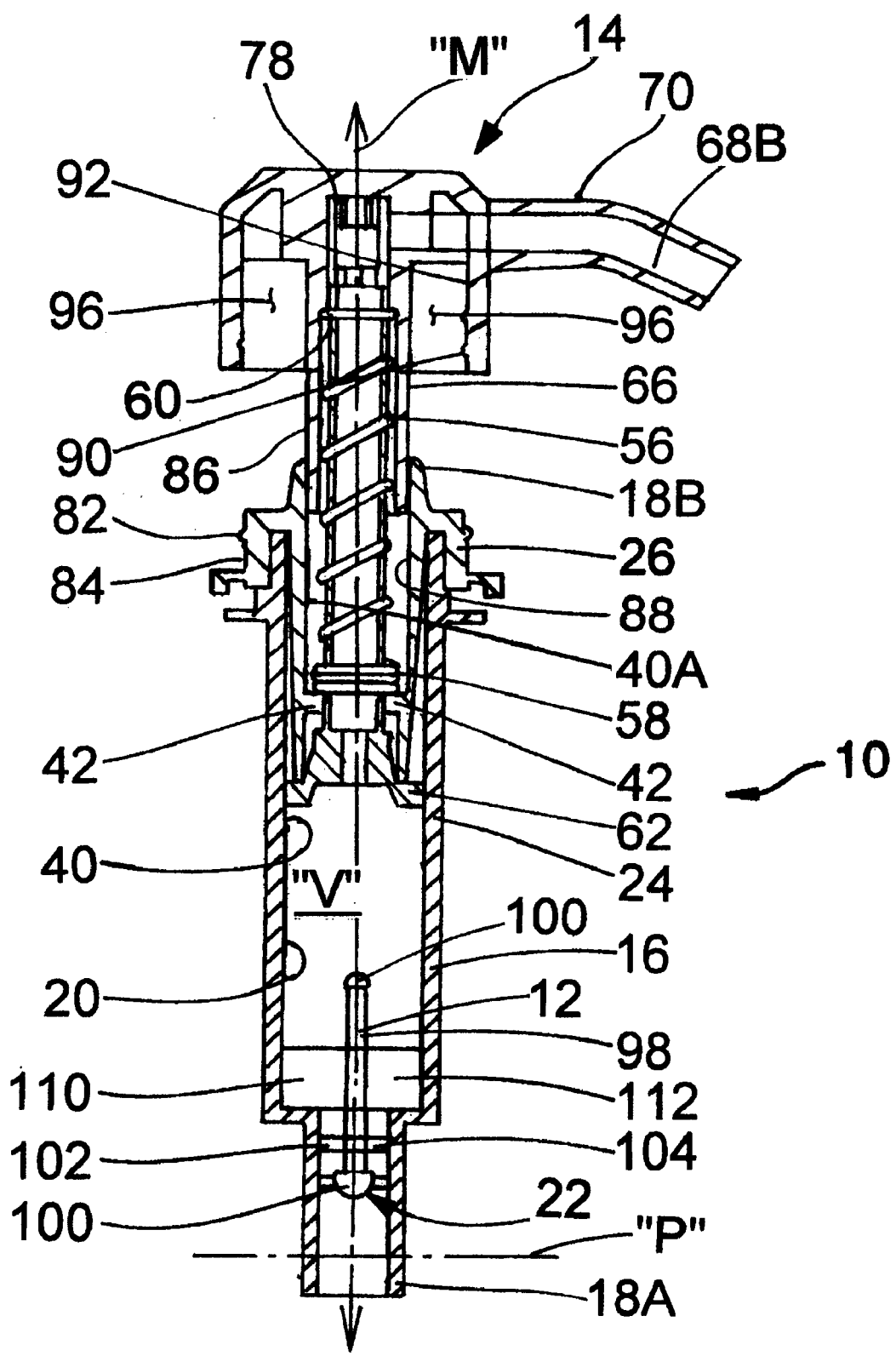
FIG. 4A is a cross-sectional view of the dispenser of FIG. 1 as taken along the line 3,4A—3,4A of FIG. 1 illustrating the dispenser in an open position.

Referring to FIGS. 1–3, the dispenser 10 includes a dispenser body 16 having a first end 18A, a second end 18B and an inner surface 20. The dispenser body 16 preferably has a generally cylindrical shape with a substantially hollow interior. During operation, the first end 18A of the dispenser 10 is preferably located within the container. Referring to FIGS. 3 and 4A, the inner surface 20 of the dispenser body 16 is preferably formed by the inner surface 40 of a primary dispenser body 24 (further described below) and the inner surface 40A of a dispenser body insert 26 (further described below).

Referring to FIG. 2, the dispenser body 16 preferably, but not necessarily, includes the primary dispenser body 24 and the dispenser body insert 26 which is attached to a top end (as viewed in FIG. 2) of the primary dispenser body 24. The dispenser body insert 26 has a generally cylindrical shape to allow the dispenser body insert 26 to slidably, matingly engage with the primary dispenser body 24. The dispenser body insert 26 has the general shape of a hollow cylindrical tube with annular members being disposed along the upper half of the dispenser body insert 26. The annular members form an outwardly facing surface 84 (further described below) for supporting at least one thread 82 (further described below). The lower end of the dispenser body insert 26 is sized to be slidably inserted inside a generally circular mouth positioned along the top end of the primary dispenser body 24.

An upper portion of the primary dispenser body 24 has an insert receiving end 28 for receiving the dispenser body insert 26. The insert receiving end 28 is in the general form of a hollow cylindrical tube shape. Proximate to the insert receiving end 28 of the primary dispenser body 24 is a generally annular flange 30. The flange 30 extends generally radially from the outer circumference of the primary insert body 24 and is disposed below the generally outwardly facing surface.

Referring to FIGS. 2–4A, the insert receiving end 28 of the primary dispenser body 24 preferably, but not necessarily, has a threaded portion 34 for engaging a channel 36 that extends around a bottom side of the dispenser body insert 26. The annular protrusions of the dispenser body insert 26 form an outer hull for the dispenser 10 which extends outwardly and downwardly in a quasi-conical fashion. The outer hull is secured over the insert receiving end 28 of the primary dispenser body 24. The top side of the dispenser body insert 26 forms the second end 18B of the dispenser body 16.

The lower portion of the dispenser body insert 26 is preferably formed by a generally downwardly extending cylindrical tube 3 which can be inserted into the primary dispenser body 24. The outer surface of the tube 38 preferably tapers gradually inwardly as one moves from the second end 18B of the dispenser body 16 toward the first end 18A of the dispenser body 16. The gradually inwardly tapered diameter of the outer surface of the tube 38 of the dispenser body insert 26 allows the bottom end of the dispenser body insert 26 to be easily inserted into the primary dispenser body 24 while creating an interference friction fit between the upper end of the outer surface of the tube 38 of the dispenser body insert 26 and the top portion of the primary dispenser body 24 when the dispenser body insert 26 is fully inserted into the primary dispenser body 24.

Referring to FIGS. 3 and 4A, the dispenser body insert 26 preferably bears a flange 42 along the inner surface 20 of the dispenser body 16. The flange 42 is preferably disposed proximate to an end of the tube 38 closest to the bottom of the dispenser 10. It is preferable that the flange 42 be oriented generally perpendicularly to the axis of movement "M" of the nozzle 14. While it is preferable that the flange 42 be generally annularly shaped, those of ordinary skill in the art will appreciate from this disclosure that the flange 42 can be segmented to form gaps (not shown) throughout the flange 42 without departing from the scope of the present invention.

The dispenser body 16 has a narrow portion 44 proximate to the bottom of the dispenser 10 as compared to an adjacent portion 46 of the dispenser body 14. Referring to FIGS. 1 and 2, the narrow portion 44 has a generally smaller diameter than that of the adjacent portion 46 located above the narrow portion 44. Accordingly, the narrow portion 44 has a reduced cross-sectional area as taken along a plane "P" generally perpendicular to an axis of motion of the nozzle "M."

Figure 4B:
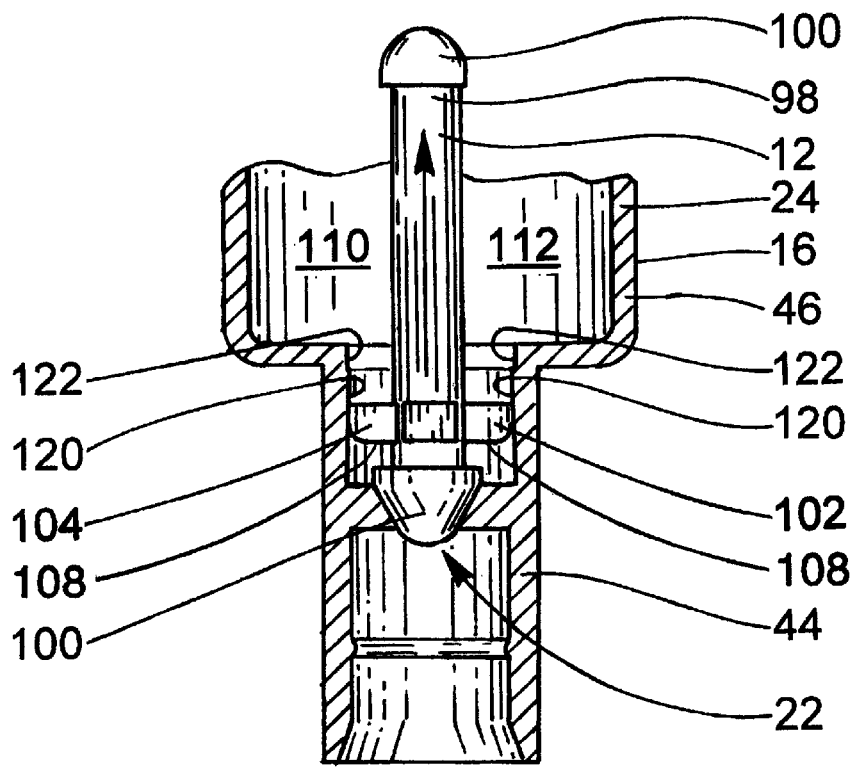
FIG. 4B is an enlarged partial cross-sectional view of the dispenser of FIG. 1 as taken along the line 4B,4C—4B,4C of FIG. 1 illustrating a valve stem disposed in a first position substantially obstructing an aperture in a narrow portion of the dispenser body.
Figure 4C:
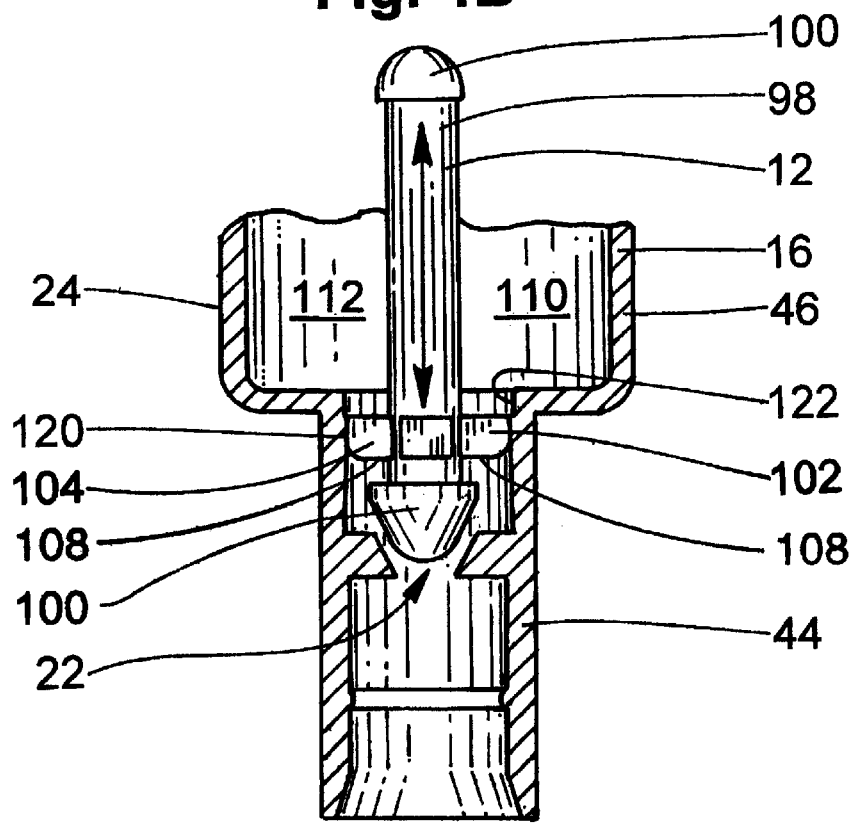
FIG. 4C is an enlarged partial cross-sectional view of the dispenser of FIG. 1 as taken along the line 4B,4C—4B,4C of FIG. 1 illustrating the valve stem of the dispenser disposed in a second position with the aperture at least partially unobstructed by the valve stem for the dispenser body to receive liquid.
Figure 5:
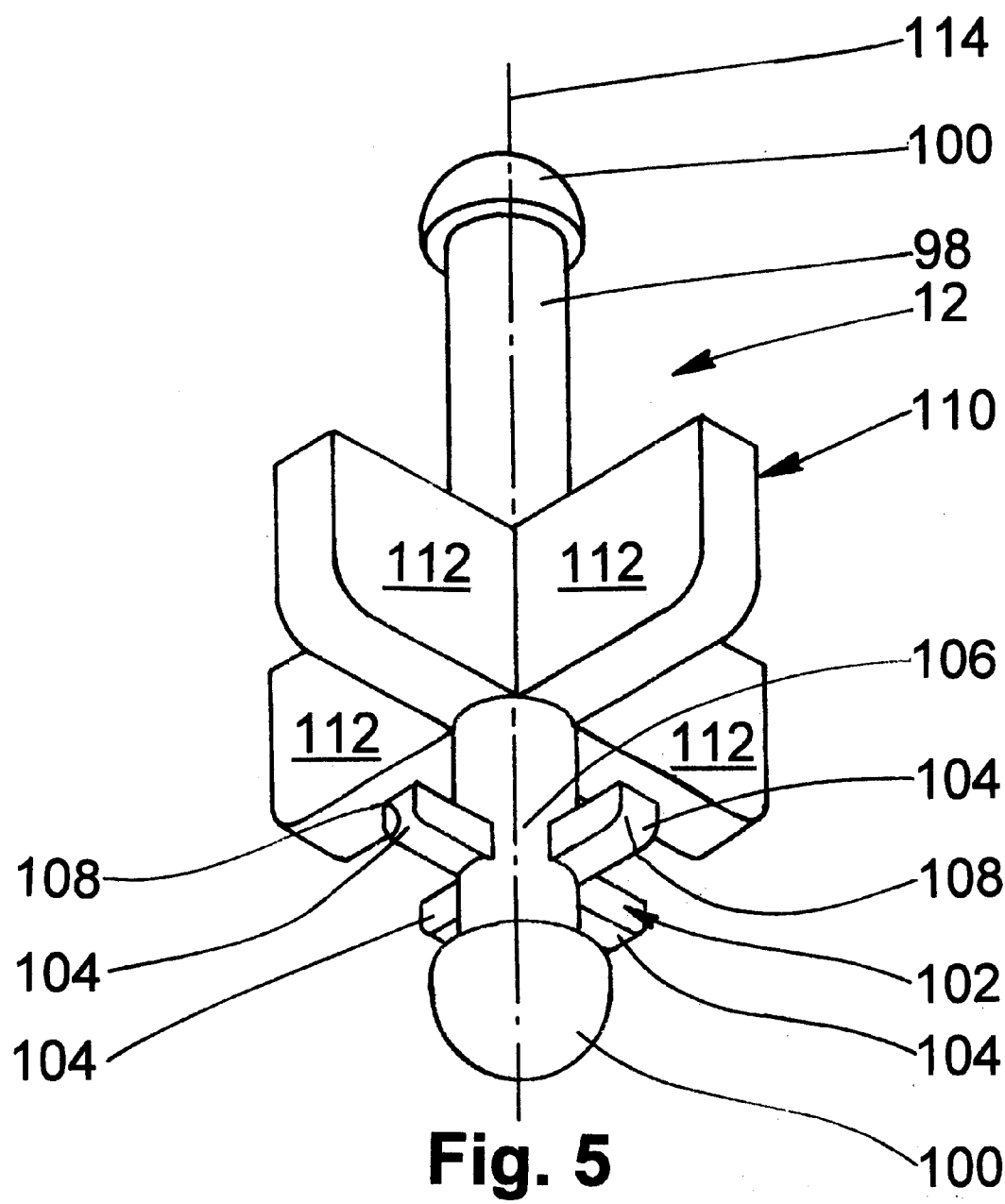
FIG. 5 is a greatly enlarged bottom perspective view of the valve stem contained in the dispenser of FIG. 1.

Referring to FIGS. 3–5, the valve stem 12 is disposed within the dispenser body 16 in engagement with the inner surface 20 proximate to the first end 18A for movement between a first position (shown in FIG. 4B) and a second position (shown in FIG. 4C). The valve stem 12 preferably has a generally elongated body 98. It is preferable, but not necessary, that the elongated body 98 have the shape of a cylinder. Rounded caps 100 are preferably attached to each end of the elongated body 98. Each rounded cap 100 preferably forms a generally hemispherical protuberance over each respective end of the elongated body 98. It is preferable, but not necessary, that the valve stem 12 have at least one projection 102 extending generally outwardly and slidably abutting the inner surface 20 of the dispenser body 16 to limit the motion of the valve stem 12 to linear motion within the dispenser body 16.

Referring to FIGS. 4B and 4C, the at least one projection 102 of the valve stem 12 engages the inner surface 54 of the dispenser 10 along the narrow portion 44. The narrow portion 44 of the dispenser body 16 has an inwardly tapered surface 120 that tapers generally inwardly along the sides of the narrow portion 44 at the upper end of the narrow portion 44. The inwardly tapered surface 120 binds with the valve stem 12 to limit the motion of the valve stem 12 away from the bottom of the dispenser 10. Thus, the valve stem 12 is secured into a second position by the abutment of the at least one projection 102 and an upper end of the inwardly tapered surface 120 when the valve stem 12 has reached the second position. The inwardly tapered surface 120 preferably extends uniformly around the narrow portion 44 and extends further inwards as one moves away from the bottom of the dispenser 10. The gradual narrowing of the diameter of the inwardly tapered surface 120 of the narrow portion 44 combined with the generally right angled upper outer edges of the projections 102 arrests the upwardly motion of the valve stem 12 when the valve stem 12 reaches the second position. Since the inwardly tapered surface 120 only abuttingly contacts the at least one projection 102, the inwardly tapered surface 120 and the at least one projection 102 disengage when there is no upwardly driving force on the valve stem 12.

At the upper end of the narrow portion 44 is an indentation 122 which has a diameter greater than that of the upper portion of the inwardly tapered surface 120. The indentation 122 forms a shoulder which in combination with the curved portion 108 of the lower surface of the projections 102 simplifies the insertion of the valve stem 12 into the narrow portion 44 during the assembly of the dispenser 10. While it is preferred that a generally inwardly tapered surface 120 be used to secure the valve stem 12 in the second position, those of ordinary skill in the art will appreciate that other methods can be used to secure valve stem 12 in the second position, as detailed below.

As an alternative to using an inwardly tapered surface 120, the primary dispenser body 24 can have a wall (not shown) laterally disposed between the narrow portion 44 and the adjacent portion 46. The wall would be used in conjunction with a hole (not shown) generally centrally placed therein. The combination wall and hole would effectively create a lip which extends generally radially inwardly from the upper end of the narrow portion-44 to limit the linear movement of the valve stem away from the bottom of the dispenser 10.

It is preferable that a flange 42 (which in the preferred embodiment formed by a portion of the dispenser body insert 26) is disposed along the inner surface 20 of the dispenser body 16 and extends generally inwardly. Referring to FIGS. 3 and 4A, an elastic member 56 preferably has one end 58 disposed on the flange 42 and another end 60 disposed against a portion of the nozzle 14 to bias the nozzle 14 generally outwardly away from the dispenser body 16. By positioning the elastic member 56 above a stopper 62 (further described below), the dispenser 10 can take advantage of a maximum internal volume "V" for receiving and storing liquid prior to transporting the liquid into the nozzle 14. The elastic member 56 is preferably a coil spring positioned over a tube 64 (further described below).

The nozzle 14 is slidably engaged with the second end 18B of the dispenser body 16 and is capable of ejecting at least a portion of the liquid contained in the dispenser body 16 while the nozzle 14 is being depressed generally toward the first end 18A of the dispenser body 16. Referring to FIGS. 1 and 9, the nozzle 14 preferably has a generally cylindrical shape with a chute 66 extending generally downwardly from the bottom of the nozzle 14. A hollow 72 is formed within the chute 66 and extends generally upwardly into the nozzle 14 to connect to a first passage 68A. A spout 70 preferably extends generally laterally from a side of the nozzle 14 for guiding liquid that is ejected from the dispenser 10.

A second passage 68B extends through the spout 70 and is in fluid communication with the first passage 68A. Thus the hollow 72, the first passage 68A, and the second passage 68B combine to form a liquid path through the nozzle 14. While it is preferable that the nozzle 14 has a spout directing liquid generally downwardly and outwardly from the top of the nozzle 14, those of ordinary skill in the art will appreciate from this disclosure that a spray nozzle or the like could be used without departing from the scope of the present invention.

Referring to FIGS. 3 and 9, a tube 64 is preferably attached to the nozzle 14 for conveying the liquid contained in the dispenser body 16 to the nozzle 14. The nozzle 14 preferably has a receptacle which is complementarily shaped to receive the tube 64. The receptacle extends generally downwardly from the inner surface of the top of the nozzle. The tube 64 has a fluid receiving end 74 which extends into the dispenser body 16. The top end of the tube 64 is preferably secured against a shoulder 73 of the nozzle which is disposed about a top end of the hollow 72 proximate to the first passage 68A (the dispensed liquid traverses the hollow 72 while being conveyed in the tube 64).

A stopper 62 is preferably disposed about the outer surface of the tube 64 proximate to the fluid receiving end 74 and extends generally outwardly to contact the inner surface 20 of the dispenser body 16. Referring to FIGS. 3 and 4, it is preferable, that the elastic member 56 is disposed in the dispenser body 16 on a side of the stopper 62 opposite from the first end 18A of the dispenser body 16. This results in the internal volume "V" (defined by the portion of the dispenser body 16 between the aperture 22 and the stopper 74) being maximized because it is not necessary to position an elastic member between the aperture 22 and the stopper 74 to bias the nozzle 14 generally outwardly from the dispenser body 16.

Referring to FIGS. 1 and 3, the dispenser 10 preferably includes at least one thread 82 disposed on a generally outwardly facing surface 84 of the dispenser body 16 proximate to the second end 18B of the dispenser body 16 for releasably threadably engaging the nozzle 14. The threads 82 allow the interface between the chute 66 of the tube 64 and the inner surface of the dispenser body insert 26 to be free of threaded surfaces while still allowing the nozzle 14 to be detachably secured to the dispenser body 16 in the closed position by a user. This reduces the amount of contaminants, such as water, which are admitted into the dispenser 10 via gaps between the outer surface of the chute 66 and the inner surface of the dispenser body insert 26. The slidable engagement between the nozzle 14 and the dispenser body 16 occurs between a generally smooth continuous nozzle surface 86 and a generally smooth continuous dispenser body surface 88 which are in complementary, slidable, facing engagement. Thus, the positioning of the at least one thread 82 on an outwardly facing surface 84 of the dispenser body insert 26 allows for the tightest possible tolerance between the chute 66 of the nozzle 14 and the inner surface of the dispenser body insert 26 while still allowing the nozzle 14 to be detachably secured to the dispenser body 16.

As best shown in FIG. 9, the nozzle 14 preferably has at least another thread 90 on a generally inwardly facing surface 92 for engaging the at least one thread 82 of the dispenser body 16. A bottom side 94 of the nozzle 14 (which faces the dispenser body 16 during operation) includes a generally annular groove 96 which extends generally along and proximate to a lateral perimeter of the side 94. The groove 96 forms the generally inwardly. facing surface 92 bearing the at least another thread 90.

Referring to the valve stem 12 shown in FIG. 5, the at least one projection 102 preferably includes a first plurality of beams 104 radially extending from and generally equidistantly distributed along a perimeter 106 of the generally elongated body 98. While it is preferred that the at least one projection 102 include four beams 104, those of ordinary skill in the art will appreciate from this disclosure that the projections 102 can have various shapes. For example, the at least one projection 102 can be a single annular member (not shown) disposed about the perimeter 106 of the elongated body 98 and having holes therein to allow the passage of liquid therethrough without departing from the scope of the present invention. Similarly, the projections 102 can use beams 104 or other protuberances (not shown) which are not evenly spaced about the perimeter 106 of the elongated body 98 without departing from the scope of the present invention.

As mentioned above, each of the first plurality of beams 104 preferably has a curved lower portion 108 to facilitate the downward sliding of the valve stem 12 in the dispenser body 16. The upper edge of each at least one projection 102 is generally angled to form a comer to facilitate the engagement of the at least one projection 102 with the inwardly tapered surface 120 of the dispenser body 16. Thus, while the valve stem 12 is in the second position, the at least one projection 102 abuts the inwardly tapered surface 120 of the narrow portion 44.

Referring to FIGS. 3 and 4A, at least another projection 110 slidably abuts a portion of the inner surface 20 of the dispenser body 16 not having the reduced cross-sectional area The combination of the at least one projection 102 and the at least another projection 110 results in the valve stem 12 smoothly moving within the dispenser body 16 in a generally linear fashion.

As best shown in FIG. 5, it is preferable, but not necessary, that the at least another projection 110 include a second plurality of beams 112 radially extending from and generally equidistantly distributed along a perimeter 106 of the generally elongated body 98. While it is preferable that four beams 112 are equidistantly spaced about the perimeter 106 of the valve stem 12, those of ordinary skill in the art will appreciate from this disclosure that any number of beams 112 can be used without departing from the scope of the present invention. Similarly, the spacing of the beams 112 or other protuberances (not shown) about the perimeter 106 of the valve stem 12 can be uneven without departing from the scope of the present invention. Referring to FIGS. 5, 7 and 8, it is preferable, but not necessary, that the first plurality of beams 102 and the second plurality of beams 110 be generally aligned, one behind the other, when the valve stem is viewed along the valve stem axis 114.

While the nozzle 14 is being depressed generally toward the first end 18A of the dispenser 10, the valve stem 12 moves to the first position (shown in FIG. 4B) and substantially obstructs the aperture 22 to generally prevent liquid from flowing through the aperture 22. Those of ordinary skill in the art will appreciate from this disclosure that small amounts of liquid can pass through the aperture 22 depending upon the tolerance errors between the rounded cap 100 of the valve stem 12 and the aperture 22 while the valve stem 12 still generally prevents liquid from flowing through the aperture 22.

When the nozzle 14 is moved away from the first end 18A of the dispenser body 16, the valve stem 12 moves toward the second position (shown in FIG. 4C) causing the aperture 22 to be at least partially unobstructed by the valve stem 12 so that the dispenser body 16 can receive liquid via the aperture 22. As detailed above, the valve stem 12 and the dispenser body 16 are configured to limit the motion of the valve stem 12 between the first and second positions to linear motion. Those of ordinary skill in the art will appreciate that due to typical manufacturing tolerances used to produce the valve stem 12 and the dispenser body 16, it is possible that slight variances in the linear motion may occur without substantially causing the valve stem 12 to depart from using overall linear motion. Accordingly, those of ordinary skill in the art will appreciate that the term "linear motion" refers to generally linear motion within typical manufacturing tolerances accepted within the dispenser manufacturing industry.

Referring to FIGS. 3 and 9, it is preferable, but not necessary, that the dispenser 10 include a tamper indicator 116 which removably secures the nozzle 14 to the dispenser body 16. The first time the nozzle 14 is moved away from the dispenser body 16 the tamper indicator 116 is separated and broken. As is known to those of ordinary skill in the art, a broken tamper indicator 116 alerts users that a product using the dispenser 10 may have been tampered with. Referring to FIG. 9, the tamper indicator is attached to a bottom portion of the nozzle 14 and is preferably breakably attached to a portion of the dispenser body 16.

Referring to FIGS. 1 and 2, a bottle adapter 118 is preferably, but not necessarily, used to secure the dispenser 10 to the container. In the preferred embodiment, the bottle adapter 118 uses interior threads (not shown) to threadably secure the dispenser 10 over a mouth of the container.

Referring to FIGS. 1–9, the dispenser 10 operates as follows. The dispenser 10 is inserted in (or is already formed over) the mouth of a container. Referring to FIGS. 1 and 9, a user rotates the nozzle 14 to disengage the at least another thread 90 of the nozzle 14 from the at least one thread 82 of the dispenser body 16. As the nozzle 14 is moved generally outwardly from the dispenser body 16, the tamper indicator 116 is broken. Referring to FIG. 4A, once the nozzle 14 is threadably disengaged from the dispenser body 16, the elastic member 56 biases the nozzle 14 into an outward position. While the nozzle 14 is moving generally outwardly from the dispenser body 16, the volume "V" in the dispenser body 16 (between the aperture 22 and the stopper 62) which receives liquid is increased and the pressure differential between the inside of the container and the inside of the dispenser 10 causes the valve stem 12 to move toward the second position (shown in FIG. 4C). The pressure differential between the inside of the dispenser 10 and the inside of the container is slightly greater when at least a portion of the fluid remains in the tube 64. Accordingly, it can sometimes take a few repetitions of depressing and releasing the nozzle 14 to begin the dispensing of liquid from the nozzle 14 when the dispenser 10 is first being used.

While the valve stem 12 is disengaged from the aperture 22, liquid within the container is suctioned into the dispenser body 16 and at least partially fills the available volume "V." Then, a user depresses the nozzle 14 toward the first end 18A of the dispenser 10 causing the valve stem 12 to move toward the first position (shown in FIG. 4B) to generally obstruct the aperture 22 preventing the liquid contained in the volume "V" of the dispenser body 16 from exiting the dispenser body 16 via the aperture 22. The valve stem 12 is driven generally toward the first position by the slight increase in pressure caused by the reduction of the volume "V" caused by the stopper 62. As the volume "V" is reduced by the stopper 62 being driven downwardly, liquid enters the tube 64 through the fluid receiving end 74, is transported to the nozzle 14, and is ejected from the spout 70. A user repeats the depressing and releasing of the nozzle 14 until the desired amount of liquid has been ejected from the spout 70 and then, threadably secures the nozzle 14 to the dispenser body 16.

It is recognized by those of ordinary skill in the art that changes may be made to the above described embodiment of the invention without departing from the broad inventive concept thereof. It is understood therefore, that this invention is not limited to the particular dispenser embodiment described, but is intended to cover all modifications which are within the spirit and scope of the invention as defined by the appended claims.

I claim:

1. A dispenser for transferring a liquid from a container; comprising:
    a dispenser body having a first end, a second end and an inner surface, the first end having an aperture through which the dispenser body is capable of receiving at least a portion of the liquid;
    a nozzle slideably engaged with the second end of the dispenser body and capable of ejecting at least a portion of the liquid contained in the dispenser body while the nozzle is being depressed generally toward the first end of the dispenser body; and
    a valve stem slideably disposed within the dispenser body in engagement with the inner surface proximate to the first end for movement between a first position and a second position, while the nozzle is being depressed generally toward the first end of the dispenser the valve stem moves to the first position and substantially obstructs the aperture to generally prevent the liquid from flowing through the aperture, while the nozzle is being displaced away from the first end of the dispenser body the valve stem moves to the second position causing the aperture to be at least partially unobstructed by the valve stem so that the dispenser body is capable of receiving the liquid, wherein the valve stem includes at least one projection extending generally outwardly and slideably abutting the inner surface of the dispenser body to limit the motion of the valve stem between the first and second positions to linear motion within the dispenser body.

2. The dispenser of claim 1 wherein the valve stem has a generally elongated body.

3. The dispenser of claim 1 wherein the valve stem has a generally elongated body and the at least one projection comprises a first plurality of beams radially extending from and generally equidistantly distributed along a perimeter of the generally elongated body.

4. The dispenser of claim 1 wherein the dispenser body has a narrow portion proximate to the first end of the dispenser as compared to an adjacent portion of the dispenser body, the narrow portion having a reduced cross-sectional area as taken along a plane generally perpendicular to an axis of motion of the nozzle, the at least one projection of the valve stem engaging the inner surface of the dispenser along the narrow portion.

5. The dispenser of claim 4 wherein the narrow portion includes an inwardly tapered section inside of the dispenser body to limit the linear motion of the valve stem when the valve stem is driven away from the first position, wherein the second position is defined by the position of the valve stem while the inwardly tapered section engages the at least one projection to prevent the valve stem from moving further away from the first end of the dispenser.

6. The dispenser of claim 5 wherein at least another projection slidably abuts a portion of the inner surface of the dispenser body not having the reduced cross-sectional area.

7. The dispenser of claim 6 wherein the valve stem has a generally elongated body and the at least another projection comprises a second plurality of beams radially extending from and generally equidistantly distributed along a perimeter of the generally elongated body.

8. The dispenser of claim 7 wherein the at least one projection comprises a first plurality of beams radially extending from the perimeter of the generally elongated body, the first plurality of beams and the second plurality of beams being generally aligned, one behind the other, when the valve stem is viewed along a valve stem axis.

9. A dispenser for transferring a liquid from a container, comprising:
    a dispenser body having a first end, a second end and an inner surface, the first end having an aperture through which the dispenser body is capable of receiving at least a portion of the liquid;
    at least one thread disposed on a generally outwardly facing surface of the dispenser body proximate to the second end;

a nozzle slideably engaged with the second end of the dispenser body and capable of ejecting at least a portion of the liquid contained in the dispenser body while the nozzle is being depressed generally toward the first end of the dispenser body, the thread on the outward surface of the dispenser body releasably threadably engaging the nozzle, wherein the slideable engagement between the nozzle and the dispenser body occurs between a generally smooth, continuous nozzle surface and a generally smooth, continuous dispenser body surface which are in complementary, slideable, facing engagement; and a valve stem slideably disposed within the dispenser body in engagement with the inner surface proximate to the first end for movement between a first position and a second position, while the nozzle is being depressed generally toward the first end of the dispenser the valve stem moves to the first position and substantially obstructs the aperture to generally prevent the liquid from flowing through the aperture, while the nozzle is being displaced away from the first end of the dispenser body the valve stem moves to the second position causing the aperture to be at least partially unobstructed by the valve stem so that the dispenser body is capable of receiving the liquid, wherein the valve stem and the dispenser body are configured to limit the motion of the valve stem between the first and second positions to linear motion.

10. The dispenser of claim 1 further comprising a tamper indicator removably securing the nozzle to the dispenser body wherein displacing the nozzle away from the dispenser body breaks the tamper indicator.

11. A dispenser for transferring a liquid from a container, comprising:

a dispenser body having a first end, a second end and an inner surface, the first end having an aperture through which the dispenser body is capable of receiving at least a portion of the liquid;

a nozzle slideably engaged with the second end of the dispenser body and capable of ejecting at least a portion of the liquid contained in the dispenser body while the nozzle is being depressed generally toward the first end of the dispenser body;

a valve stem slideably disposed within the dispenser body in engagement with the inner surface proximate to the first end for movement between a fist position and a second position, while the nozzle is being depressed generally toward the first end of the dispenser the valve stem moves to the first position and substantially obstructs the aperture to generally prevent the liquid from flowing through the aperture, while the nozzle is being displaced away from the fist end of the dispenser body the valve stem moves to the second position causing the aperture to be at least partially unobstructed by the valve stem so that die dispenser body is capable of receiving the liquid, wherein the valve stem and the dispenser body are configured to limit the motion of the valve stem between the first and second positions to linear motion;

a flange disposed along the inner surface of the dispenser body and extending generally inwardly; and an elastic member having one end disposed on the flange and having another end disposed against a portion of the nozzle to bias the nozzle generally outwardly away from the dispenser body.

12. The dispenser of claim 11 further comprising:

a tube attached to the nozzle for conveying the liquid contained in the dispenser body to the nozzle, the tube having a fluid receiving end; and a stopper disposed about the outer surface of the tube proximate to the fluid receiving end and extending generally outwardly to contact the inner surface of the dispenser body, wherein the elastic member is disposed in the dispenser body on a side of the stopper opposite from the first end of the dispenser.

13. The dispenser of claim 12 wherein the dispenser body is formed by a primary dispenser body and a dispenser body insert which is disposed proximate an end of the primary dispenser body opposite from the first end of the dispenser body, the dispenser body insert bearing the flange proximate to an end facing the first end of the dispenser body to dispose the flange along the inner surface of the dispenser body.

14. A dispenser for transferring liquid from a container, comprising:

a dispenser body having a first end, a second end and an inner surface, the first end having an aperture through which the dispenser body is capable of receiving at least a portion of the liquid;

a nozzle slidably engaged with the second end of the dispenser body and capable of ejecting at least a portion of the liquid contained in the dispenser body while the nozzle is being depressed generally toward the first end of the dispenser body; and at least one thread disposed on a generally outwardly facing surface of the dispenser body proximate to the second end of the dispenser body and capable of releasably threadably engaging the nozzle.

15. The dispenser of claim 14 wherein the nozzle has at least another thread on a generally inwardly facing surface for engaging the at least one thread of the dispenser body.

16. The dispenser of claim 15 wherein a side of the nozzle which faces the dispenser body includes a groove which extends generally along and proximate to a perimeter of the side, the groove providing the generally inwardly facing surface bearing the at least another thread.

17. The dispenser of claim 15 wherein the slidable engagement between the nozzle and the dispenser body occurs between a generally smooth, continuous nozzle surface and a generally smooth, continuous dispenser body surface which are in complementary, slidable, facing engagement.

18. The dispenser of claim 16 further comprising a valve stem slidably disposed within the dispenser body in engagement with the inner surface proximate to the first end for movement between a first position and a second position, while the nozzle is being depressed generally toward the first end of the dispenser the valve stem moves to the first position and substantially obstructs the aperture to generally prevent the liquid from flowing through the aperture, while the nozzle is being displaced away from the first end of the dispenser body the valve stem moves to the second position causing the aperture to be at least partially unobstructed by the valve stem so that the dispenser body is capable of receiving the liquid, wherein the valve stem and the dispenser body are configured to limit the motion of the valve stem between the first and second positions to linear motion.

19. The dispenser of claim 18 further comprising a tamper indicator removably securing the nozzle to the dispenser body wherein displacing the nozzle away from the dispenser body breaks the tamper indicator.

20. A dispenser for transferring liquid from a container, comprising:

a dispenser body having a first end, a second end and an inner surface, the first end having an aperture through which the dispenser body is capable of receiving at least a portion of the liquid; and a nozzle slidably engaged with the second end of the dispenser body and capable of ejecting at least a portion of the liquid contained in the dispenser body while the nozzle is being depressed generally toward the first end of the dispenser body, wherein the slidable engagement between the nozzle and the dispenser body occurs between a generally smooth, continuous nozzle surface and a generally smooth, continuous dispenser body surface which are in complementary, slidable, facing engagement.

21. The dispenser of claim 20 further comprising at least one thread disposed on a generally outwardly facing surface of the dispenser body proximate to the second end for releasably threadably engaging the nozzle.

22. The dispenser of claim 21 further comprising a valve stem slidably disposed within the dispenser body in engagement with the inner surface proximate to the first end for movement between a first position and a second position, while the nozzle is being depressed generally toward the first end of the dispenser the valve stem moves to the first position and substantially obstructs the aperture to generally prevent the liquid from flowing through the aperture, while the nozzle is being displaced away from the first end of the dispenser body the valve stem moves to the second position causing the aperture to be at least partially unobstructed by the valve stem so that the dispenser body is capable of receiving the liquid, wherein the valve stem and the dispenser body are configured to limit the motion of the valve stem between the first and second positions to linear motion.

* * * * *